United States Patent
Chenworth

(10) Patent No.: US 12,414,512 B2
(45) Date of Patent: Sep. 16, 2025

(54) ROOT STICK ROOT WATERING DEVICE

(71) Applicant: Alan J Chenworth, North Edwards, CA (US)

(72) Inventor: Alan J Chenworth, North Edwards, CA (US)

( * ) Notice: Subject to any disclaimer, the term of this patent is extended or adjusted under 35 U.S.C. 154(b) by 0 days.

(21) Appl. No.: 18/208,307

(22) Filed: Jun. 11, 2023

(65) Prior Publication Data
US 2024/0415082 A1    Dec. 19, 2024

(51) Int. Cl.
*A01G 25/06*    (2006.01)
*A01G 29/00*    (2006.01)

(52) U.S. Cl.
CPC .............. *A01G 29/00* (2013.01); *A01G 25/06* (2013.01)

(58) Field of Classification Search
CPC .................................. A01G 29/00; A01G 25/06
See application file for complete search history.

(56) References Cited

U.S. PATENT DOCUMENTS

| | | | | |
|---|---|---|---|---|
| 4,697,952 | A * | 10/1987 | Maddock | A01G 25/06 405/36 |
| 5,901,497 | A * | 5/1999 | Bulvin | A01G 29/00 47/47 |
| 8,413,372 | B2 * | 4/2013 | King | A01G 29/00 47/79 |
| 11,154,017 | B2 * | 10/2021 | Sowers | A01G 9/28 |
| 2016/0286745 | A1 * | 10/2016 | Riffe | A01G 29/00 |
| 2019/0283229 | A1 * | 9/2019 | Reissmann | A01B 1/227 |

FOREIGN PATENT DOCUMENTS

CN    106804402 A    *    6/2017

* cited by examiner

*Primary Examiner* — Amber R Anderson
*Assistant Examiner* — Stacy N Lawson
(74) *Attorney, Agent, or Firm* — David B. Tingey; K. Russell Griggs; Kimon McConkie

(57) ABSTRACT

A root irrigation tool includes a cylindrical member including a first opening at a proximal end and a second opening at a distal end, wherein a distal portion of the cylindrical member includes a plurality of perforations, wherein the cylindrical member is configured to be inserted into the ground adjacent to a tree.

18 Claims, 1 Drawing Sheet

ROOT STICK ROOT WATERING DEVICE

BACKGROUND OF THE INVENTION

1. Field of the Invention

This invention relates to equipment used to bring water and oxygen to the roots of trees.

2. Background

Currently there are only a few limited solutions for bringing water to the roots of trees without irrigating the surface, but they do not meet industry needs. This solution is different in that (1) it is not pressurized; (2) it allows for a water hose to be easily placed within (or removed from) the delivery system; (3) with multiple rows of drain-holes, this invention has a much greater aeration/water surface distribution area; and 4) it is easy to clean/flush out so that distribution holes don't get clogged.

BRIEF SUMMARY OF THE INVENTION

After observing the difficulty that water has penetrating from the surface down to the root-level of trees, particularly in arid environments, it was apparent that it would be advantageous to have a device that could readily transport water down to the root level of trees, as well as allowing for better aerations of the roots. This device should be able to be easily installed with a new tree, or added later if a tree was previously established. The device described in this summary fills these needs, as it is an effective method to bypass the soil surface and evaporation horizon, bringing water directly from the surface down to the root level.

Disclosed is a root irrigation tool design. This irrigation tool is made of either plastic, pvc or metal, typically in the form of a length of pipe with open ends, where the bottom end (about 40%, though it can be customized to fit the needs of the tree/plant) is filled with rows of irrigation holes so that water can pass through and irrigate the ground near and below the roots of the plant. The top of the pipe is also open so that a hose can be placed in the top to deliver water. When the irrigation tool is not actively delivering water to the roots of the plant, it acts as an aeration device that will allow the roots to receive the air that they need to thrive.

Typically, this device is installed when the tree is planted, though it can be installed at a later time. This device may be built with a tapered top to better facilitate the insertion of a hose. The standard would be built at 18" in length and 1.0" inside diameter. It may also be scaled in size, both length and diameter, to accommodate different sizes of trees, where a tree with a larger root ball would need a longer irrigation tool. These scaled sizes would typically be between 16" and 30" in length; and 1" to 1.5" inside diameter.

This invention is a root watering pipe, with an unperforated head/neck and perforated, slotted or screen base. This works by carrying water from the surface down to the root level where it can seep into the ground at and below the roots. It also allows aeration of the roots. The length of pipe varies as needed, depending on the size of the tree and related hole, but generally is standardized 18", 24" or 30" in depth. The ideal width of the pipe (ID) is at 1.0" or 1.25" diameter, though it can be scaled to the needs of the specific tree. It will have holes/perforation or screen in the bottom 40%. The top may be slightly dilated to better allow a hose. The bottom (in ground) end is open to allow for increase saturation, though it can be tapered to allow for better ground penetration if installed on an existing tree.

DETAILED DESCRIPTION

The present invention is a root irrigation tool.

In its most basic version, the device is made from an 18" length of pipe or a 24" length of pipe (but may be scaled to any size, generally between 16"-30"), typically 1" inside diameter (can also be 1.25" inside diameter), where about the bottom 40% is perforated/screened with rows of holes to allow for water/air to irrigate into the ground. Holes/perforations are ³⁄₁₆" in diameter (but can range from ⅛"-¼"). The number of holes varies by length of the pipe. The bottom is also open for better water conductivity, though if modified, a gentle taper may prevent debris from clogging the irrigation tool during installation. It should be noted that the design can be scaled to allow for different sizes of root-balls, and the top of the pipe may have a taper or a flare to better accept a hose. Open top and bottom also allows for easy cleaning—insertion of hose can flush mud, gravel and debris from irrigation tool.

Figure 1A:
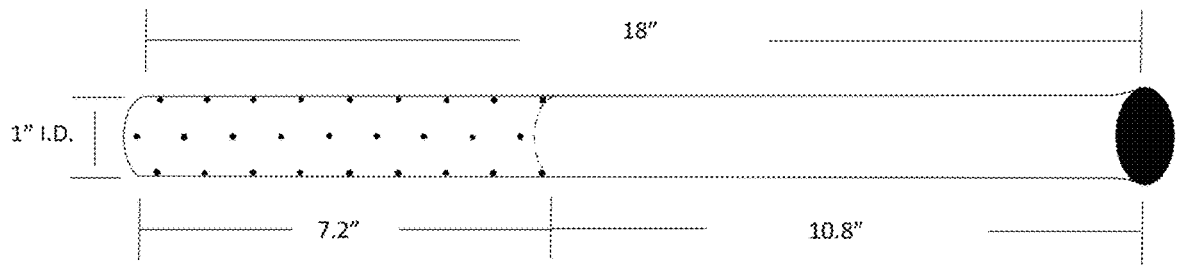
FIG. 1A-FIG. 1B illustrate root watering devices in accordance with one or more embodiments of the present disclosure.
Figure 1B:
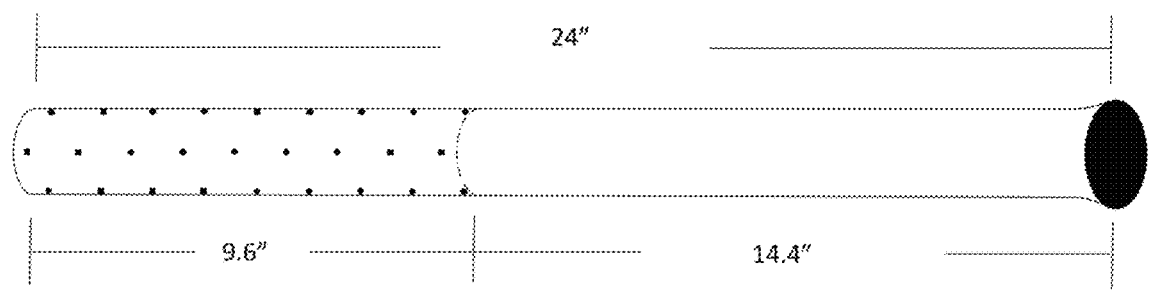

A diagram example of this root irrigation tool (FIGS. 1A and 1B) is included that shows irrigation tool and screening/perforations.

Different features, variations and multiple different embodiments have been shown and described with various details. What has been described in this application, at times in terms of specific embodiments, is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A root irrigation system, comprising:
    a cylindrical member having a central axis, a proximal end, and a distal end, the cylindrical member further comprising a first open end at the proximal end, and a second open end at the distal end, wherein a distal portion of the cylindrical member includes a plurality of perforations, in a plurality of rows positioned radially from the central axis about a circumference of the cylindrical member to selectively allow water or air to pass through (i) the perforations and (ii) the open end at the distal end,
    wherein the cylindrical member comprises a length of 16 inches to 30 inches and an inner diameter of 1 inch to 1.5 inches, wherein the distal portion of the cylindrical member that includes the plurality of rows of perforations comprises a length of 7.2 inches to 9.6 inches from the distal end to the row of perforations furthest from the distal end, wherein each of the perforations comprise a diameter of ⅛ inch to ¼ inch, and wherein the cylindrical member is configured to be inserted into the ground adjacent to a root system of a tree, wherein when the cylindrical member is inserted into the ground, the open end at the distal end remains open.

2. The root irrigation system of claim 1, wherein the proximal end of the cylindrical member is flared.

3. The root irrigation system of claim 1, wherein the first open end is configured to receive a hose.

4. The root irrigation system of claim 1, wherein the distal portion of the cylindrical member that includes the plurality of perforations comprises around 40% of the cylindrical member.

5. The root irrigation system of claim 1, wherein the cylindrical member comprises a length of 24 inches.

6. The root irrigation system of claim 1, wherein the cylindrical member comprises a length of 18 inches.

7. The root irrigation system of claim 1, wherein the cylindrical member comprises an inner diameter of 1 inch.

8. The root irrigation system of claim 1, wherein each of the plurality of perforations comprise a diameter of 3/16 inch.

9. The root irrigation system of claim 1, wherein a number of perforations in the distal portion of the cylindrical member is proportional to the length of the cylindrical member.

10. The root irrigation system of claim 1, wherein the inner diameter and the length of the cylindrical member are each determined based on a size of the tree.

11. The root irrigation system of claim 1, wherein the cylindrical member comprises PVC.

12. A root irrigation system, comprising:
a cylindrical member having a central axis, a proximal end, and a distal end, the cylindrical member further comprising a first open end at the proximal end, and a second open end at the distal end, wherein a distal portion of the cylindrical member includes a plurality of perforations in a plurality of rows positioned radially from the central axis about a circumference of the cylindrical member to selectively allow water or air to pass through (i) the perforations and (ii) the open end at the distal end,
wherein the cylindrical member comprises a length of 16 inches to 30 inches and an inner diameter of 1 inch to 1.5 inches, wherein the distal portion of the cylindrical member that includes the plurality of rows of perforations comprises a length of 7.2 inches to 9.6 inches from the distal end, wherein each of the perforations comprise a diameter of ⅛ inch to ¼ inch, and
wherein the cylindrical member is configured to be inserted into the ground adjacent to a root system of a tree, wherein when the cylindrical member is inserted into the ground, the open end at the distal end remains open, and
wherein each row of perforations is offset from immediately distal or proximal rows, such that perforations of each row do not line up longitudinally with perforations of the immediately distal or proximal rows.

13. The root irrigation system of claim 12, wherein the inner diameter of the cylindrical member is between 1 inch and 1.25 inches.

14. The root irrigation system of claim 12, wherein the proximal end of the cylindrical member is flared.

15. A root irrigation system, comprising:
a cylindrical member having a central axis, a proximal end, and a distal end, the cylindrical member further comprising a first open end at the proximal end, and a second open end at the distal end, wherein a distal portion of the cylindrical member includes a plurality of perforations in a plurality of rows positioned radially from the central axis about a circumference of the cylindrical member to selectively allow water or air to pass through (i) the perforations and (ii) the open end at the distal end,
wherein the cylindrical member comprises a length of 16 inches to 30 inches and an inner diameter of 1 inch to 1.5 inches, wherein the distal portion of the cylindrical member that includes the plurality of rows of perforations comprises a length of 7.2 inches to 9.6 inches from the distal end, wherein each of the perforations comprise a diameter of ⅛ inch to ¼ inch,
wherein the cylindrical member is configured to be inserted into the ground adjacent to a root system of a tree, wherein when the cylindrical member is inserted into the ground, the open end at the distal end remains open,
wherein the proximal end of the cylindrical member is flared, and
wherein the distal portion of the cylindrical member that includes the plurality of perforations comprises around 40% of the cylindrical member.

16. The root irrigation system of claim 15, wherein the cylindrical member comprises an inner diameter of 1.25 inches.

17. The root irrigation system of claim 15, wherein the cylindrical member comprises a length of 30 inches.

18. The root irrigation system of claim 15, wherein each of the plurality of perforations comprise a diameter of 3/16 inch.

* * * * *